(12) United States Patent
Durand et al.

(10) Patent No.: US 11,792,536 B2
(45) Date of Patent: Oct. 17, 2023

(54) DEVICE AND METHOD FOR PARASITIC HEAT COMPENSATION IN AN INFRARED CAMERA

(71) Applicant: LYNRED, Palaiseau (FR)

(72) Inventors: Alain Durand, Voiron (FR); Nicolas Boudou, Grenoble (FR)

(73) Assignee: LYNRED, Palaiseau (FR)

( * ) Notice: Subject to any disclaimer, the term of this patent is extended or adjusted under 35 U.S.C. 154(b) by 0 days.

(21) Appl. No.: 16/972,967

(22) PCT Filed: Jun. 7, 2019

(86) PCT No.: PCT/EP2019/064934
§ 371 (c)(1),
(2) Date: Dec. 7, 2020

(87) PCT Pub. No.: WO2019/234215
PCT Pub. Date: Dec. 12, 2019

(65) Prior Publication Data
US 2021/0250469 A1    Aug. 12, 2021

(30) Foreign Application Priority Data

Jun. 8, 2018 (FR) ...................................... 1800587

(51) Int. Cl.
*H04N 23/81* (2023.01)
(52) U.S. Cl.
CPC .................................... *H04N 23/81* (2023.01)
(58) Field of Classification Search
CPC .... H04N 17/002; H04N 5/217; H04N 5/2178; H04N 5/33; H04N 5/357; H04N 5/36963
See application file for complete search history.

(56) References Cited

U.S. PATENT DOCUMENTS

| 6,211,521 B1* | 4/2001 | Bawolek | G02B 5/201 |
| | | | 250/339.02 |
| 7,828,463 B1* | 11/2010 | Willis | F21V 23/0442 |
| | | | 362/276 |
| 10,389,953 B2* | 8/2019 | Hoelter | H04N 5/2253 |
| 2002/0055203 A1* | 5/2002 | Komobuchi | H01L 23/34 |
| | | | 257/796 |

(Continued)

FOREIGN PATENT DOCUMENTS

| EP | 2034285 A1 | 3/2009 |
| JP | 2009-133825 A | 6/2009 |

(Continued)

OTHER PUBLICATIONS

Authorized Officer: Trimeche, Mejdi, International Search Report issued in counterpart PCT application No. PCT/EP2019/064934, dated Dec. 8, 2019, 3 pp.

(Continued)

*Primary Examiner* — Peter D Le
(74) *Attorney, Agent, or Firm* — KAPLAN BREYER SCHWARZ, LLP

(57) ABSTRACT

An infrared camera includes a housing containing a pixel array. The pixel array includes: image pixels forming an image sensor arranged to receive infrared light from an image scene; and a plurality of parasitic heat sensing pixels arranged to receive infrared light from different portions of an interior surface of the housing.

10 Claims, 6 Drawing Sheets

(56) References Cited

U.S. PATENT DOCUMENTS

| | | | | |
|---|---|---|---|---|
| 2002/0125430 | A1* | 9/2002 | Wood | G01J 5/24 250/338.1 |
| 2002/0190208 | A1* | 12/2002 | Wood | G01J 5/24 250/338.1 |
| 2003/0006374 | A1* | 1/2003 | McManus | G01J 5/22 250/338.1 |
| 2003/0111603 | A1* | 6/2003 | Sone | G01J 5/40 250/338.1 |
| 2003/0147333 | A1* | 8/2003 | Tokuda | G11B 7/127 369/121 |
| 2004/0069929 | A1* | 4/2004 | Furukawa | H01L 27/14643 348/E3.018 |
| 2004/0212877 | A1* | 10/2004 | Borchard | G02B 13/14 359/359 |
| 2005/0092924 | A1* | 5/2005 | Secundo | G02F 1/0147 250/331 |
| 2005/0200012 | A1* | 9/2005 | Kinsman | H01L 27/14618 257/737 |
| 2006/0033674 | A1* | 2/2006 | Essig, Jr. | C02F 1/14 343/912 |
| 2006/0276702 | A1* | 12/2006 | McGinnis | A61B 5/6848 600/372 |
| 2007/0284532 | A1* | 12/2007 | Nakanishi | G01J 5/22 250/339.02 |
| 2008/0111894 | A1* | 5/2008 | Tanimoto | H04N 5/33 348/222.1 |
| 2008/0179520 | A1* | 7/2008 | Kauffman | H04N 5/33 250/332 |
| 2008/0198240 | A1* | 8/2008 | Duncan | H04N 9/735 348/223.1 |
| 2008/0237467 | A1* | 10/2008 | Oda | G01J 5/0215 250/338.3 |
| 2008/0237469 | A1* | 10/2008 | Oda | G01J 5/0235 250/339.02 |
| 2009/0101821 | A1* | 4/2009 | Masafumi | G01J 5/10 250/338.3 |
| 2010/0025584 | A1* | 2/2010 | Sasaki | G01J 5/10 250/338.4 |
| 2010/0230594 | A1* | 9/2010 | Honda | H01L 27/14623 250/332 |
| 2012/0049313 | A1* | 3/2012 | Kwon | H01L 27/14649 257/467 |
| 2012/0119088 | A1* | 5/2012 | Honda | G01J 5/024 250/332 |
| 2012/0194718 | A1* | 8/2012 | Sato | H04N 5/3572 348/294 |
| 2012/0211642 | A1* | 8/2012 | Iwamoto | H04N 5/378 250/208.1 |
| 2012/0249801 | A1* | 10/2012 | Nozaki | G06T 5/008 348/164 |
| 2013/0027574 | A1* | 1/2013 | Solhusvik | H01L 27/14618 348/222.1 |
| 2014/0176725 | A1* | 6/2014 | Stuart | G01J 5/089 348/164 |
| 2014/0231576 | A1* | 8/2014 | Rinker | F41G 7/2253 244/3.16 |
| 2015/0156407 | A1* | 6/2015 | Wang | H04N 5/23206 348/164 |
| 2017/0134704 | A1* | 5/2017 | Otsubo | H04N 5/33 |
| 2017/0201662 | A1* | 7/2017 | Kim | H04N 9/09 |
| 2018/0084205 | A1 | 3/2018 | Kitagawa | |
| 2018/0184031 | A1* | 6/2018 | Morita | H04N 5/357 |
| 2020/0059610 | A1* | 2/2020 | Maegawa | G01J 1/02 |
| 2021/0160439 | A1* | 5/2021 | Hosaka | G01J 5/024 |

FOREIGN PATENT DOCUMENTS

| | | |
|---|---|---|
| WO | 2011/121706 A1 | 10/2011 |
| WO | 2014/173464 A1 | 10/2014 |

OTHER PUBLICATIONS

Office Action issued in European Patent Application No. 19728452-4, dated Jul. 14, 2023, 7 pp.

* cited by examiner

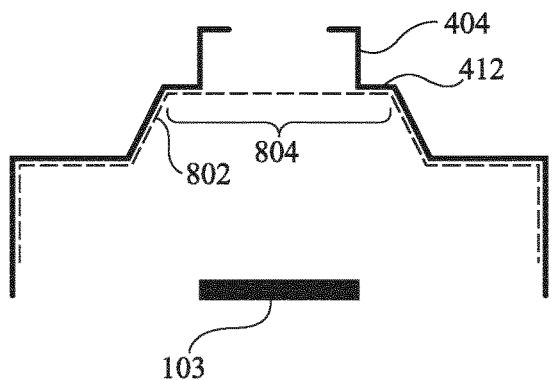
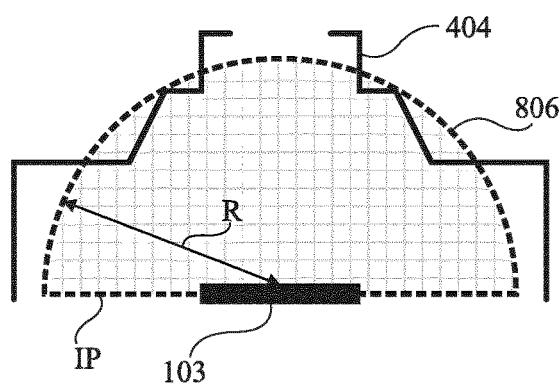
Fig 8A  Fig 8B
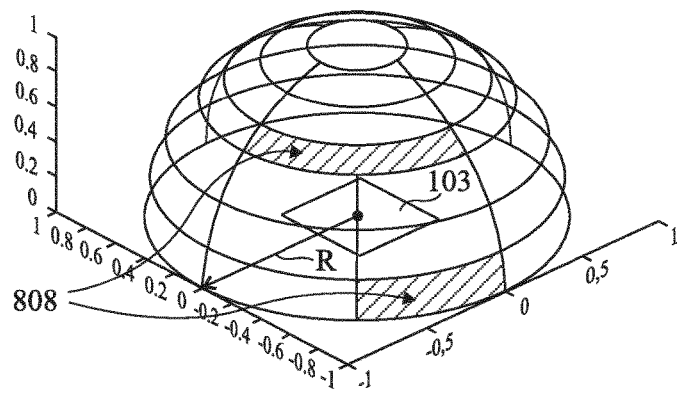
Fig 8C
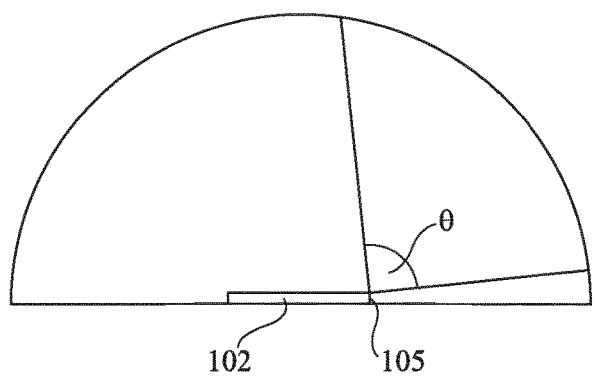
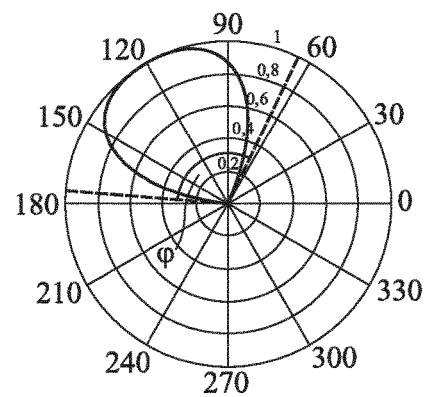
Fig 8D  Fig 8E

DEVICE AND METHOD FOR PARASITIC HEAT COMPENSATION IN AN INFRARED CAMERA

The present patent application claims priority from the French patent application filed on 8 Jun. 2018 and assigned application no. FR18/00587, the contents of which is hereby incorporated by reference.

FIELD

The present disclosure relates to the field of infrared cameras and in particular to a device and method for thermography.

BACKGROUND

In the field of thermography, infrared (IR) cameras, such as microbolometers or cooled IR imaging devices, are used to capture thermal images of an image scene. Such IR cameras generally comprise an arrangement of IR-sensitive detectors forming a pixel array.

Each pixel of the pixel array converts a measured temperature at the pixel into a corresponding voltage signal, which is converted by an ADC (analog to digital converter) into a digital output signal.

The temperature present at each pixel is a function of the scene temperature, but also of various other thermal components, such as the temperature of the substrate of the pixel array, and also parasitic heat received from the other heat sources. The substrate temperature is usually relatively uniform across the pixel array, and thus it can generally be estimated relatively precisely using one or more temperature sensors in the substrate. However, the parasitic heat received by each pixel from other sources is far more challenging to estimate, and can lead to relatively high imprecision in the temperature readings measured by each pixel. Indeed, while a temperature probe could be added to the housing, estimations of the parasitic heat affecting each pixel of the pixel array based on the reading from such a probe is far from accurate. Thus the use of such a probe does not permit the production of thermal images of high precision, for example accurate to within a few degrees Celsius. Furthermore, such a temperature probe is a relatively high cost component.

There is thus a need in the art for a low cost solution for accurately estimating and compensating for the parasitic heat received by pixels in an infrared camera.

SUMMARY

It is an aim of embodiments of the present description to at least partially address one or more problems in the prior art.

According to one aspect, there is provided an infrared camera comprising a housing containing a pixel array, wherein the pixel array comprises: image pixels forming an image sensor arranged to receive infrared light from an image scene; and a plurality of parasitic heat sensing pixels arranged to receive infrared light from different portions of an interior surface of said housing. For example, a first of the parasitic heat sensing pixels is orientated in a different manner from a second of the parasitic heat sensing pixels such that the first and second parasitic heat sensing pixels receive infrared light from different portions of the interior surface of the housing.

According to one embodiment, the infrared camera further comprises a signal correction circuit configured to receive readings from the plurality of parasitic heat sensing pixels, and to perform 2D signal correction on signals captured by said image sensor based on said readings.

According to one embodiment, the infrared camera further comprises a non-volatile memory storing a conversion matrix for converting the readings into correction values for performing the 2D signal correction.

According to one embodiment, the first parasitic heat sensing pixel is configured to directly receive infrared light only from a first area of the interior surface of the housing; and the second parasitic heat sensing pixel is configured to directly receive infrared light only from a second area of the interior surface of the housing; and the first and second areas are non-overlapping.

According to one embodiment, the infrared camera further comprises at least one partial light shield positioned over the parasitic heat sensing pixels, the at least one partial light shield partially restricting the field of view of each parasitic heat sensing pixel.

According to one embodiment, the at least one partial light shield comprises at least one opening associated with each parasitic heat sensing pixel, the positions of the openings being misaligned with a heat sensitive layer of each pixel.

According to one embodiment, the at least one partial light shield is arranged such that one or more of the parasitic heat sensing pixels receives only reflected infrared light.

According to one embodiment, each of the pixels of the pixel array is a microbolometer comprising a heat sensitive membrane suspended over a reflective surface; and the distance separating the heat sensitive membrane from the reflective surface in the parasitic heat sensing pixels is different from the distance separating the heat sensitive membrane from the reflective surface in the image pixels.

According to one embodiment, the infrared camera further comprises at least one wall formed adjacent to one or more of the parasitic heat sensing pixels and blocking infrared light at certain angles from falling on said one or more parasitic heat sensing pixels.

According to a further aspect, there is provided a method of correcting, by a processing device, an image captured by an image sensor of a pixel array of an infrared camera, the method comprising: receiving readings from a plurality of parasitic heat sensing pixels of the pixel array, the parasitic heat sensing pixels being arranged to receive infrared light from different portions of an interior surface of a housing of the IR camera; and correcting signals captured by the image sensor based on the readings. For example, a first of the parasitic heat sensing pixels is orientated in a different manner from a second of the parasitic heat sensing pixels such that the first and second parasitic heat sensing pixels receive infrared light from different portions of the interior surface of the housing.

According to one embodiment, correcting the signals captured by the image sensor, based on the readings comprises converting the readings into correction values for performing 2D signal correction of the signals, the conversion being based on one or more conversion matrices.

According to one embodiment, converting the readings into correction values comprises: converting, using a first conversion matrix, the readings into estimates of the luminous flux received from each of a plurality of zones of a model of the interior surface of the housing, each zone being considered to have a uniform temperature; and converting, using a second conversion matrix, the estimates of the luminous flux received from each of the plurality of zones into the pixel correction values.

According to one embodiment, the model of the interior surface of the housing is a dome.

According to a further aspect, there is provided a processing device configured to implement the above method.

According to a further aspect, there is provided a non-transitory storage medium storing computing instructions for implementing the above method when executed by a processing device.

According to yet a further aspect, there is provided a method of calibrating an infrared camera comprising a pixel array housed in a housing, the pixel array having an image sensor and one or more parasitic heat sensing pixels arranged to receive infrared light from different portions of an interior surface of the housing, the method comprising: receiving, by a processing device, one or more readings from each of said parasitic heat sensing pixels and from each pixel of the pixel array; and generating, by the processing device based on said one or more readings, one or more conversion matrices for converting readings from the parasitic heat sensing pixels into pixel correction values for performing 2D signal correction of signals captured by the image sensor. For example, generating the one or more conversion matrices comprises: determining by the processing device, for each image pixel of the image sensor and for each of the parasitic heat sensing pixels based on an assumption of the responsivity of each pixel, a relative transfer function based on an etendue of each pixel with respect to each of a plurality of zones of the interior surface. The relative transfer functions are for example determined between the surface contribution of each of the zones and the luminous flux received by the parasitic heat sensing pixels and by the image pixels. This corresponds for example to the etendue between each pixel and the plurality of zones. It is for example assumed that all of the pixels have the same response in terms of their voltage generated for a given received luminous flux of a given power and for a given solid angle. As known by those skilled in the art, in the field of optics, the etendue defines the extent to which light is spread out in area and angle.

According to one embodiment, generating the one or more conversion matrices further comprises: determining the responsivity of each of the image pixels and each of the parasitic heat sensing pixels. For example, this involves determining the relative responsivity of each pixel for a same solid angle. For the image pixels of the image sensor, the responsivity is for example determined using 2-point non-uniformity-correction.

According to one embodiment, the responsivity of the parasitic heat sensing pixels is determined by placing a black body in the field view of the pixels of said pixel array, and taking readings from said parasitic heat sensing pixels at at least two different temperatures.

According to one embodiment, determining the relative transfer function based on an etendue of each pixel comprises defining, at least partially by the processing device, a model of the interior surface of said housing comprising a plurality of zones of uniform temperature, and calculating by the processing device the etendue of each pixel with respect to each of the zones of said model based on the geometry of the camera housing and of the pixel array.

According to one embodiment, the model is in the form of a dome.

According to one embodiment, the method further comprises determining, by the processing device, a radius of the dome based on an average reading captured by said image sensor while said black body is placed in the field view of the pixels of said pixel array.

According to one embodiment, each of the plurality of zones of the model has the same surface area.

According to a further aspect, there is provided a processing device configured to implement the above method.

According to yet a further aspect, there is provided a non-transitory storage medium storing computing instructions for implementing the above method when executed by a processing device.

BRIEF DESCRIPTION OF THE DRAWINGS

The foregoing and other features and advantages will become apparent from the following detailed description of embodiments, given by way of illustration and not limitation with reference to the accompanying drawings, in which:

FIGS. 8A and 8B are cross-section views representing examples of models of an interior surface of the housing of an IR camera according to example embodiments of the present disclosure;

FIG. 8C represents the model of FIG. 8B in more detail;

FIGS. 8D and 8E represent angular sensitivity of a parasitic heat sensing pixel according to an example embodiment of the present disclosure;

DETAILED DESCRIPTION

While embodiments are described in the following description in relation with a pixel array of the microbolometer type, it will be apparent to those skilled in the art that the methods described herein could be equally applied to other types of IR cameras, including cooled devices.

Throughout the present disclosure, the tem "substantially" is used to designate a tolerance of plus or minus 10% of the value in question. Furthermore, the following terms are considered to have the following definitions in the present disclosure:

pixel array—an arrangement of light sensitive pixels, in which the pixels may be arranged in columns and rows, or in other arrangements;

image sensor—an arrangement, usually rectangular, of pixels of the pixel array that serves for capturing an image from the image scene;

image pixel—each pixel of the image sensor;

parasitic heat sensing pixel—a pixel having a field of view that has been modified with respect to that of the image pixels in order to favour the capture of parasitic heat. For example, each parasitic heat sensing pixel is configured to capture a greater portion of parasitic heat than each image pixel of the pixel array; and 2D signal correction—the correction of the signals or readings generated by an image sensor prior to the creation of the image, the image optionally being subjected to one or more subsequent steps of image correction.

Figure 1:
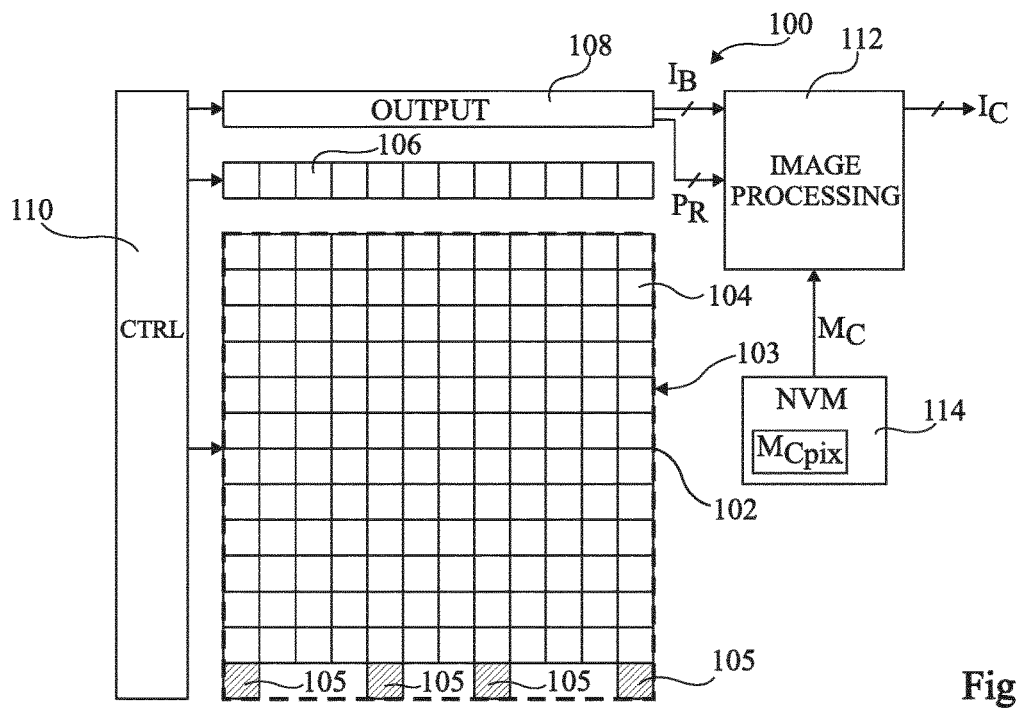
FIG. 1 schematically illustrates an imaging device of an IR camera according to an example embodiment of the present disclosure.

FIG. 1 illustrates an IR imaging device 100 comprising a pixel array 102 sensitive to IR light. For example, in some embodiments, the pixel array is sensitive to long-wave IR light, such as light with a wavelength in the range 7 to 16 μm or higher.

The pixel array 102 is indicated by a dashed rectangle in FIG. 1, and comprises an image sensor 103 formed of image pixels 104, and one or more additional pixels 105 for detecting parasitic heat.

In the example of FIG. 1, the image sensor 103 comprises 144 image pixels 104 arranged in 12 rows and 12 columns. In alternative embodiments, the image sensor 103 could comprise any number of rows and columns of pixels. Typically, the image sensor for example comprises 640 by 480, or 1024 by 768 image pixels.

In the example of FIG. 1, there are four parasitic heat sensing pixels 105 positioned along one edge of the image sensor 103. However, in alternative embodiments, there could be any number of parasitic heat sensing pixels 105 positioned anywhere in or around the image sensor 103. The parasitic heat sensing pixels are for example formed in the same image plane as the image pixels 104 of the image sensor.

In the example of FIG. 1, each column of pixels of the array 102 is associated with a corresponding reference structure 106. Though not functionally a picture element, this structure will be referred to herein as a "reference pixel" by structural analogy with the imaging (or active) pixels 104. Furthermore, an output block (OUTPUT) 108 is coupled to each column of the pixel array 102 and to each of the reference pixels 106, and provides a raw image $I_B$ comprising the signals or readings captured by the image sensor 103 and also readings $P_R$ from the parasitic heat sensing pixels 105. Indeed, a same output block 108 is for example used to read out pixel values from all of the pixels 104, 105 of the pixel array 102.

A control circuit (CTRL) 110 for example provides control signals to the pixel array 102, to the reference pixels 106, and to the output block 108.

The raw image $I_B$ and the readings $P_R$ from the parasitic heat sensing pixels 105 are for example provided to an image processing circuit (IMAGE PROCESSING) 112, which for example applies 2D signal correction to the pixels of the image to produce a corrected image IC. In particular, the image processing circuit 112 for example applies correction of parasitic heat in the captured image based on the readings $P_R$ from the parasitic heat sensing pixels 105 and based on a conversion matrix $M_{Cpix}$ stored in a non-volatile memory (NVM) 114, which for example permits a conversion of the readings $P_R$ into a correction value for each pixel of the captured image.

Indeed, a voltage reading VOUT from each image pixel 104 of the image sensor 103 can be modelled by the following equation:

$$\text{VOUT} = \mathcal{H}(\vec{P1}, T_{pix})$$

where $T_{pix}$ is the temperature of the pixel, $\vec{P1}$ is a vector representing the parameters of the pixel array effecting the temperature to voltage conversion, such as the conversion gain, losses in the readout path, etc., and $\mathcal{H}$ is the function linking the output voltage VOUT to the parameters $\vec{P1}$ and the temperature $T_{pix}$.

The temperature $T_{pix}$ of each pixel will be influenced by the various thermal components, and can for example be modelled by the following equation:

$$T_{pix} = g(\vec{P2}, \phi_{parasitic}, \phi_{scene}, T_{CMOS})$$

where $\phi_{scene}$ is the luminous flux arriving at the pixel from the image scene via the optical elements of the IR camera, $\phi_{parasitic}$ is the luminous flux arriving at the pixel from sources other than the image scene, such as from the interior surfaces of the housing of the IR camera, $T_{CMOS}$ is the temperature of the focal plane, in other words the temperature of the substrate on which the image sensor is formed, $\vec{P2}$ is a vector representing the parameters of the image pixels effecting the conversion of the received luminous flux to the temperature $T_{pix}$, of the pixel, and g is the function linking the temperature $T_{pix}$ to the parameters $\vec{P2}$ and variables $\phi_{scene}$, $\phi_{parasitic}$ and $T_{CMOS}$.

By estimating the parameters $\vec{P1}$ and $\vec{P2}$ and the variables $\phi_{parasitic}$ and $T_{CMOS}$, and by approximating the functions $\mathcal{H}$ and g, it is possible to isolate the component $\phi_{scene}$ and thereby generate a thermographic image of the scene. Among these parameters, variables and functions, it is the component $\phi_{parasitic}$ that is the most challenging to estimate accurately. Indeed, this component can vary for each image pixel based on the temperature of several different interior surfaces in the IR camera, and the effect on each pixel will depend on the distance and sensitivity of the pixel with respect to the relevant surfaces.

The present inventors have found that, by using readings from parasitic heat sensing pixels positioned in the image plane, it becomes possible to generate a relatively precise estimation of the luminous flux $\phi_{parasitic}$ received by each image pixel, without the use of a temperature probe, as will be described in more detail below.

Figure 2:
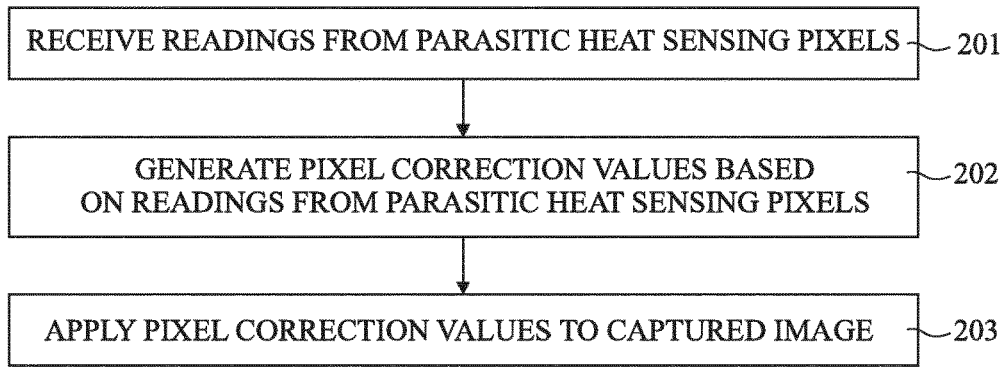
FIG. 2 is a flow diagram representing operations in a method of performing 2D signal correction of signals captured by an IR camera according to an example embodiment of the present disclosure.

FIG. 2 is a flow diagram illustrating operations in a method of correcting images captured by an image sensor of a pixel array. For example, the method is implemented by the image processing circuit 112 of FIG. 1. For example, the image processing circuit 112 is a hardware circuit, such as an ASIC (application specific integrated circuit), and thus implements the method entirely in hardware. Alternatively, at least part of the method could be implemented in software. For example, the image processing circuit 112 comprises one or more processors under the control of instructions stored in an instruction memory (not illustrated), the execution of these instructions causing at least part of the method of FIG. 2 to be executed.

In an operation 201, the readings $P_R$ captured by the parasitic heat sensing pixels 105 are received by the circuit 112.

In an operation 202, signal correction values are generated based on the readings $P_R$. For example, the conversion matrix $M_{Cpix}$, and optionally one or more further matrices stored by the non-volatile memory 114, are used to convert the readings $P_R$ into a signal correction value for each pixel of the image $I_B$, as will now be explained in more detail.

In some embodiments, the readings $P_R$ are first processed in order to extract an estimate of the temperature of a plurality q of zones of a model of the interior surface of the IR camera housing, wherein each zone of the model is for example considered to have a uniform temperature. These estimates form a luminance vector $\vec{V}_{lum}$ of the form $[\phi_1 \ldots \phi_q]$, each of the values $\phi_1 \ldots \phi_q$ representing a luminous flux from the q zones of the model. For example, the readings $P_R$ form an output vector $\vec{V}_{out}$ of the form [Out1 . . . Outn], which can for example be characterized as follows:

$$\vec{V}_{out} = M_{Clum} \cdot \vec{V}_{lum}$$

where $M_{Clum}$ defines the relationship between the luminance values $\phi_1 \ldots \phi_q$ and the n readings $P_R$ of the output vector $\vec{V}_{out}$, and is for example of the form:

$$M_{Clum} = \begin{bmatrix} P_{w1}^1 & \cdots & P_{w1}^q \\ \vdots & \ddots & \vdots \\ P_{Wn}^1 & \cdots & P_{wn}^q \end{bmatrix}$$

wherein the parameters $P_{w1}^1$ to $P_{wn}^1$ represent the relation between the readings Out1 to Outn and the luminance $\phi_i$ of each zone i.

Thus the luminance vector $\vec{V}_{lum}$ can for example be generated from the readings of the output vector $\vec{V}_{out}$ based on the following multiplication:

$$\vec{V}_{lum} = M^{-1}_{Clum} \cdot \vec{V}_{out}$$

where $M^{-1}_{Clum}$ is the inverse of the matrix $M_{Clum}$.

The parasitic luminance present at each of the p pixels of the image sensor will be represented herein by a vector $\vec{V}_{parasitic}$ of the form $[\phi_{parasitic\_1} \cdots \phi_{parasitic\_p}]$ The conversion matrix $M_{Cpix}$ is for example adapted to convert the luminance vector $\vec{V}_{lum}$ into an estimation of the parasitic luminance present at each pixel in accordance with the following equation:

$$\vec{V}_{parasitic} = M_{Cpix} \cdot \vec{V}_{lum}$$

The conversion matrix $M_{Cpix}$ is for example of dimensions p by q, where p is the number of pixels in the image sensor and q is the number of zones of the model of the interior surface of the housing.

In an operation 203, the signal correction values are applied to the pixels of the captured image. For example, this correction may be performed directly to the signals forming the raw image $I_B$, or after other forms of offset and/or gain correction have been applied to the raw image $I_B$.

In one embodiment, the signal correction is applied by subtracting, from each of the p pixels of the captured image $I_B$, the corresponding correction value from the vector $\vec{V}_{parasitic}$ In alternative embodiments, the signal correction is based on an estimation of the inverse of the function g described above in order to determine the scene component $\phi_{scene}$.

Figure 3:
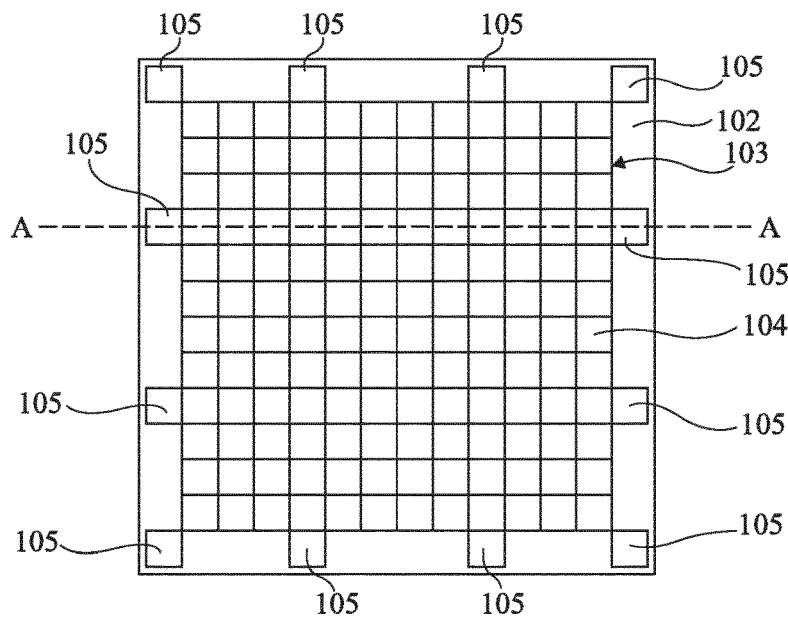
FIG. 3 is a plan view of a pixel array of an IR camera according to an example embodiment of the present disclosure.

FIG. 3 is a plan view of the pixel array 102 according to an alternative embodiment to that of FIG. 1. In the example of FIG. 3, there are 12 parasitic heat sensing pixels 105, two being positioned along each edge of the image sensor 103, and one at each corner of the image sensor 103.

Figure 4:
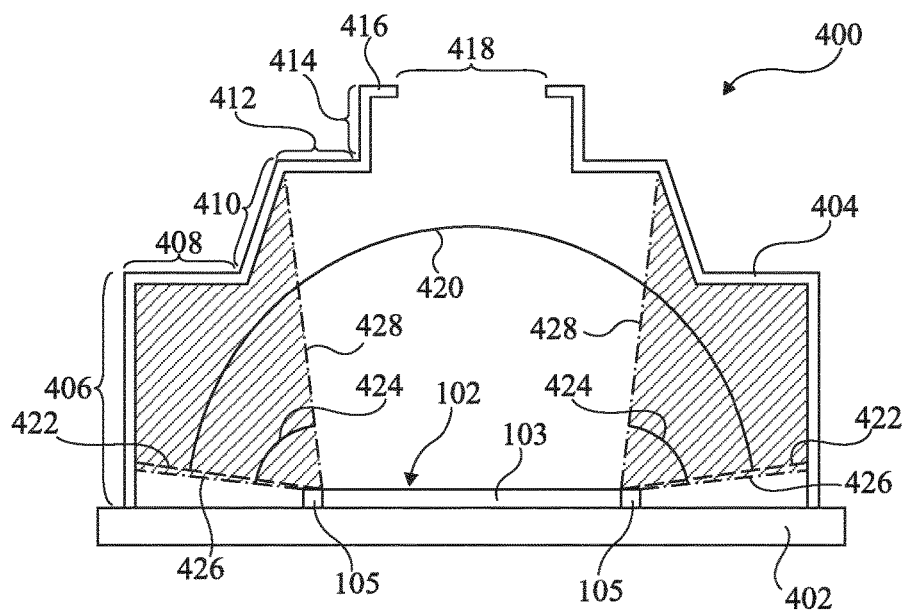
FIG. 4 is a cross-section view of an IR camera comprising the pixel array of FIG. 3.

FIG. 4 is a cross-section view, without showing the optics, of an IR camera 400 comprising the pixel array 102 of FIG. 3. The cross-section in FIG. 4 is taken along a dashed line A-A in FIG. 3 passing through two of the parasitic heat sensing pixels 105 on opposite sides of the image sensor 103.

The pixel array 102 is mounted on a substrate 402. A housing 404 of the IR camera is also mounted on the substrate 402, and houses the pixel array 102. For example, the housing 404 is formed of moulded plastic, or of metal. In the example of FIG. 4, the housing 404 has a substantially cylindrical portion 406 extending from the substrate 402, an annular portion 408 extending from a top edge of the cylindrical portion inwards and substantially parallel to the surface of the substrate 402, a portion 410 corresponding to a section of a cone extending upwards and inwards from an inner edge of the annular portion 408, an annular portion 412 extending from a top edge of the portion 410 inwards and substantially parallel to the surface of the substrate 402, a substantially cylindrical portion 414 extending from an inner edge of the annular portion 412 away from the substrate 402, and an annular portion 416 extending from a top edge of the cylindrical portion 414 inwards and substantially parallel to the surface of the substrate 402. An inner edge of the annular portion 416 delimits an aperture 418 of the housing 404, centred with respect to the image sensor 102, and via which light from the image scene enters the IR camera. The cylindrical portion 414 for example forms a lens barrel in which one or more lenses are positioned (not illustrated in the figures).

It should be noted that the particular form of the housing 404 of FIG. 4 is merely one example, and many different shapes would be possible, including non-cylindrical shapes.

An arc 420 in FIG. 4 extending between dashed lines 422 represents an example of the field of view of the image pixels of the image sensor 102, which is for example relatively large, for example of substantially 130° or more. The fields of view of the parasitic heat sensing pixels 105 are for example limited with respect to that of the image pixels, such that they receive an increased portion of parasitic heat from the interior of the housing 404. For example, the pixel 105 illustrated in FIG. 4 have fields of view respectively represented by arcs 424 extending between dashed-dotted lines 426 and 428, each parasitic heat sensing pixels 105 having a field of view limited in at least one plane to less than 90°. However, more generally, each parasitic heat sensing pixel has its field of view modified such that it receives a higher proportion of parasitic heat from the housing 404 than each image pixel. For example, each parasitic heat sensing pixel receives a luminous flux $\phi_{pix}$ of which at least 50 percent, and in some cases at least 70 percent, of the energy originates from the housing 404. In some embodiments, each parasitic heat sensing pixel is designed such that a majority, for example at least 60%, of their received flux originates from a certain zone of the housing, and the sensitivity of the pixel to flux originating from outside this zone decreases rapidly.

In some embodiments, the field of view of one or more of the parasitic heat sensing pixels 105 is restricted such that it does not encompass the aperture 418, and thus these pixels are not directly lit by the image scene. It should be noted that even if a parasitic heat sensing pixel targets a zone of the housing close to the aperture 418, such as the zone 416 in FIG. 4, the position of the parasitic heat sensing pixel in the pixel array and the lens design (light ray curvature) mean that only a relatively small quantity of light from the image scene risks being absorbed by the pixel.

The parasitic heat sensing pixels 105 are for example each oriented, in at least the plane of the pixel array, in a different manner from each other in order to detect parasitic heat from different areas of an interior surface of the housing 404 of the image sensor. For example, one of the parasitic heat sensing pixels 105 is configured to directly receive infrared light only from a first area of the interior surface of the housing, and another of the parasitic heat sensing pixels 105 is configured to directly receive infrared light only from a second area of the interior surface of the housing, the first and second areas being non-overlapping.

Examples of the structure of the parasitic heat sensing pixels 105 will now be described with reference to FIGS. 5A, 5B, 6A, 6B, 7A and 7B.

Figure 5A:
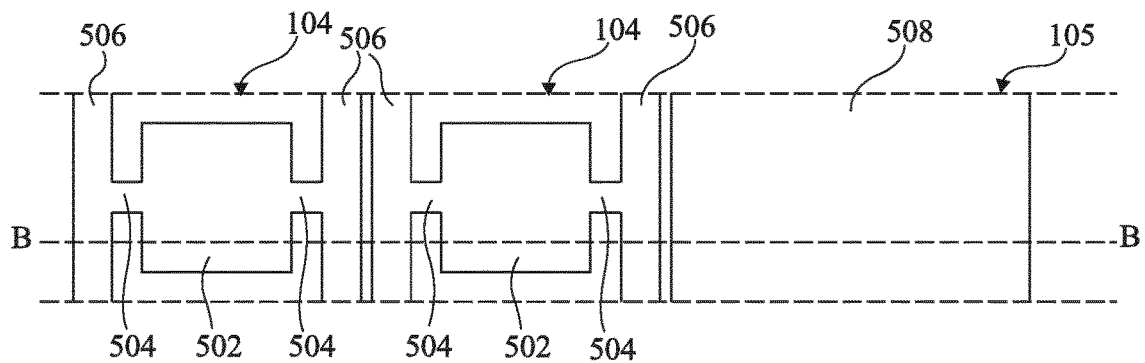
FIG. 5A is a plan view of image pixels and a parasitic heat sensing pixel of a pixel array according to an example embodiment of the present disclosure.

FIG. 5A is a plan view of a portion of the pixel array 102 of FIG. 3, and illustrates two image pixels 104 and one parasitic heat sensing pixel 105 according to an example embodiment.

In the example of FIG. 5A, the pixels are implemented by microbolometers. Each image pixel 104 for example comprises a membrane 502 suspended by arms 504 between support pillars 506. The parasitic heat sensing pixel 105 for example comprises a similar structure, but is partially shielded by a light shield 508, which restricts its field of view.

Figure 5B:
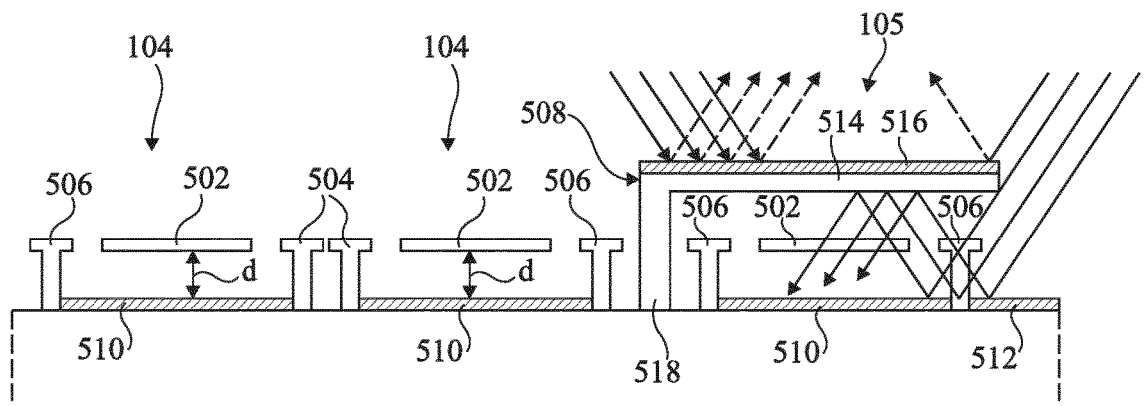
FIG. 5B is a cross-section view of the image pixels and parasitic heat sensing pixel of FIG. 5A.

FIG. 5B is a cross-section view of the structure of FIG. 5A taken along a dashed line B-B in FIG. 5A passing through the two image pixels 104 and through the parasitic heat sensing pixel 105. As illustrated, each of the image pixels 104 and the parasitic heat sensing pixel 105 for example comprises a portion 510 of a reflective layer between the corresponding pillars 506 and over which the membrane 502 is suspended at a distance d. Furthermore, the parasitic heat sensing pixel 105 for example comprises a further portion 512 of the reflective layer on a side of the pixel adjacent to one of its pillars 506.

The partial light shield 508 for example comprises a support layer 514, for example formed of Si, SiN, SiON, or another material, covered by a reflective layer 516. The support layer 514 is for example suspended over the pixel 105 by a support wall 518, which also for example blocks light from entering from one side of the pixel. The opposite side of the pixel is open, such that light at a certain angle can enter the space between the shield 508 and the reflective layer 510, and be absorbed by the membrane 502. This is aided by the portion 512 of the reflective layer, which for example directs light at a certain angle onto the underside of the partial light shield 508, from which it reflects onto the membrane 502 of the bolometer.

Figure 6A:
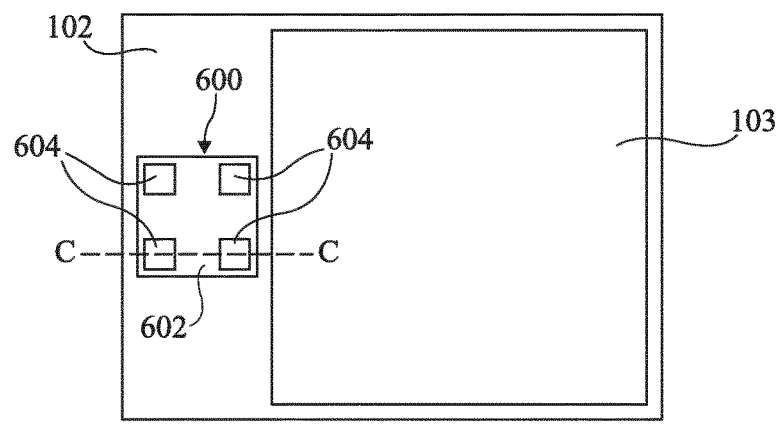
FIG. 6A is a plan view of an image sensor and of parasitic heat sensing pixels of a pixel array according to a further example embodiment of the present disclosure.

FIG. 6A is a plan view of the pixel array 102 according to a further example embodiment in which parasitic heat sensing pixels 105 are formed in a sub-array 600 adjacent to the image sensor 103, and the field of view of these pixels is partially restricted by a light shield in the form of a mask 602. In the example of FIG. 6A, the sub-array comprises four parasitic heat sensing pixels 105 arranged two-by-two, and the mask 602 comprises an opening 604 over each pixel to give each pixel a restricted field of view.

Figure 6B:
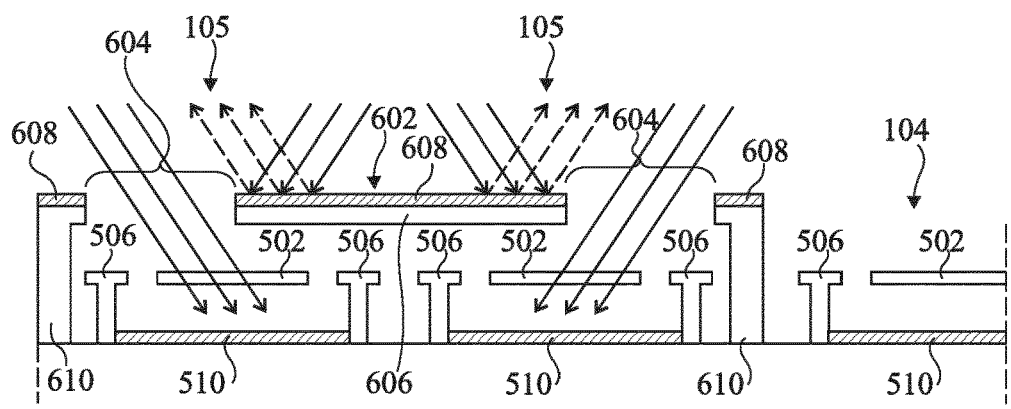
FIG. 6B is a cross-section view of part of the image sensor and some of the parasitic heat sensing pixels of FIG. 6A.

FIG. 6B is a cross-section view of the structure of FIG. 6A taken along a dashed line C-C in FIG. 6A passing through two parasitic heat sensing pixels 105 of the sub-array and through one image pixel 104 of the image sensor 103. The bolometer of each of the pixels 104, 105 for example has a structure similar to that of the pixels of FIG. 5B, and like features have been labelled with like reference numerals and will not be described again in detail.

The mask 602 for example comprises a support layer 606 covered by a reflective layer 608 and through which the openings 604 over each pixel 105 are formed. The support layer 606 and reflective layer 608 are for example suspended over the pixels 105 of the sub-array by lateral walls 610.

The openings 604 over each pixel 105 are for example misaligned with respect to the membrane 502 of each bolometer such that only light at certain angles falls on the membrane 502 of each bolometer. Each pixel 105 is for example configured to receive light from a different portion of the interior of the housing.

Figure 6C:
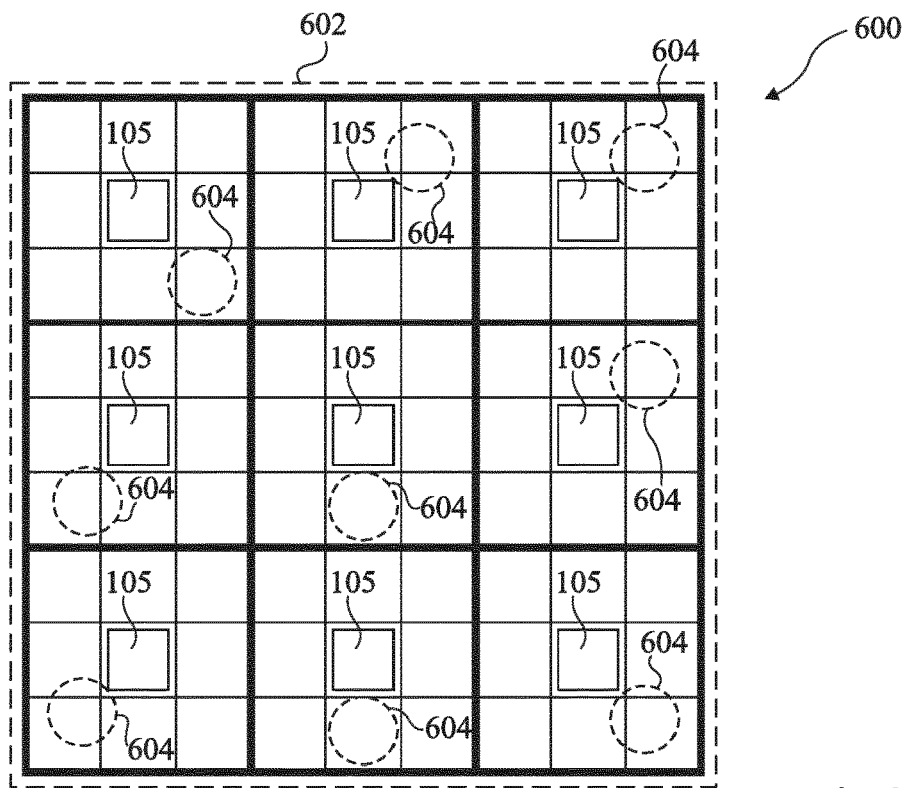
FIG. 6C is a plan view of a sub-array of parasitic heat sensing pixels of the image sensor of FIG. 6A according to a further example embodiment.

FIG. 6C is a plan view of the sub-array 600 of parasitic heat sensing pixels of the image sensor of FIG. 6A according to a variant to that represented by FIGS. 6A and 6B. In the example of FIG. 6C, the sub-array 600 comprises nine parasitic heat sensing pixels 105 arranged 3-by-3, although a larger or smaller array could alternatively by provided. The pixels 105 are spaced apart from each other.

The cover or mask 602 is represented by dashed lines line FIG. 6C, and is for example at least partially opaque to infrared light, but comprises openings 604, which are circular in the example of FIG. 6C. Each opening 604 has a width dimension (diameter in the case of a circular opening) that is for example between 50% and 150% of the width of the membrane 502 of each pixel 105. The openings 604 are positioned according to a pattern such that each pixel has a different angular view of the interior of the housing, and the field of view of each pixel can thus be de-convolved in a relatively simple manner. This has the advantage of leading to a good signal to noise ratio and a large coverage area of the interior of the housing.

In the example of FIG. 6C, the sub-array 600 is arranged in a 9-by-9 grid in which the nine locations in the $2^{nd}$, $5^{th}$ and $8^{th}$ columns and rows contain the pixels 105. An opening 604 associated with each pixel 105 is for example positioned entirely or at least partially in the area of the 3-by-3 grid in which each pixel is formed, these 3-by-3 grids being delimited by thicker lines in FIG. 6C.

In the example of FIG. 6C, a single opening 604 is associated with each pixel 105. However, in alternative embodiments, more than one opening 604 could be associated with some or all of the pixels 105, and/or some or all of the pixels 105 could receive light from more than one of the openings 604.

Figure 7A:
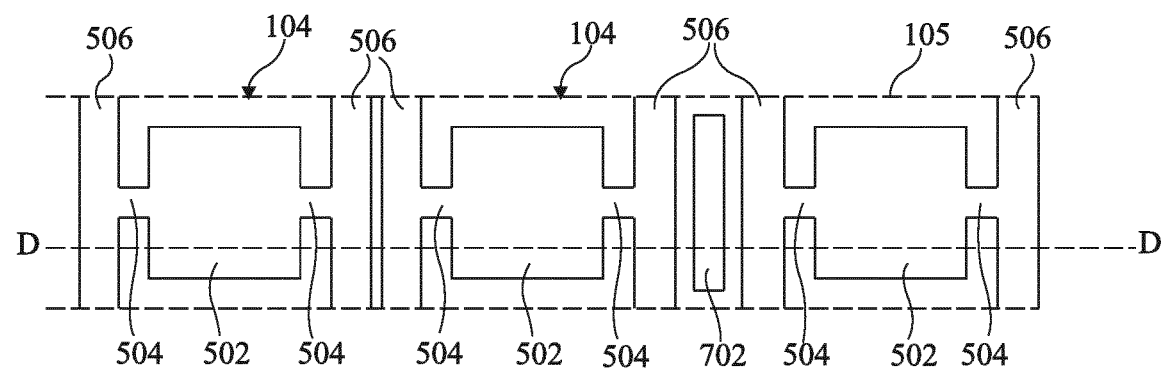
FIG. 7A is a plan view of image pixels and a parasitic heat sensing pixel of a pixel array according to a further example embodiment of the present disclosure.

FIG. 7A is a plan view of a portion the pixel array 102 of FIG. 3, and illustrates two image pixels 104 and one parasitic heat sensing pixel 105 according to a further example embodiment. The pixels of FIG. 7A are for example implemented by bolometers having a structure similar to that of the image pixels 104 of FIG. 5A, and like features have been labelled with like reference numerals and will not be described again in detail.

In the embodiment of FIG. 7A, a wall 702 is for example positioned adjacent to the parasitic heat sensing pixel 105 for restricting its field of view, as will now be described with reference to FIG. 7B.

Figure 7B:
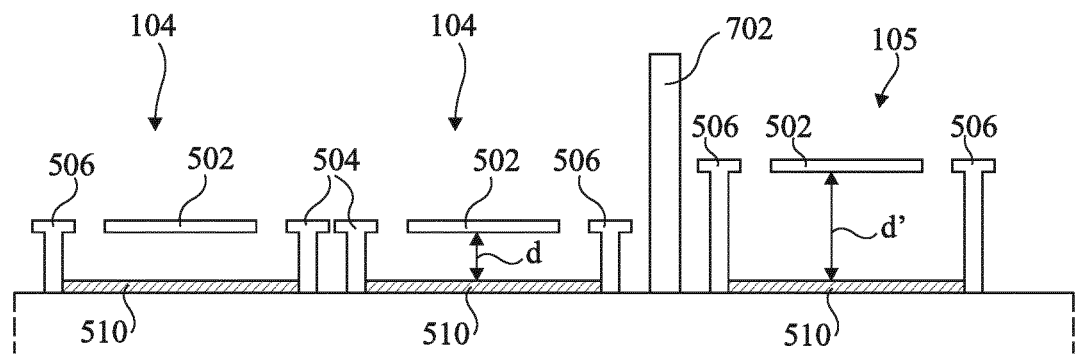
FIG. 7B is a cross-section view of the image pixels and a parasitic heat sensing pixel of FIG. 7A.

FIG. 7B is a cross-section view of the structure of FIG. 7A taken along a dashed line D-D in FIG. 7A passing through the two image pixels 104 and through the parasitic heat sensing pixel 105.

In the example of FIGS. 7A and 7B, the parasitic heat sensing pixel 105 has a distance d' separating the membrane 502 of its bolometer from its reflective layer 510, the distance d' being greater than the distance d in the bolometers of the image pixels 104. For example, the distance d' is equal to substantially twice the distance d. This increased distance results in a modification of the cavity Fabry-Perot of the bolometer, increasing the angular absorption. Furthermore, the wall 702 for example permits the azimuthal angle of the pixel to be restricted.

As described above, the signal correction applied to images captured by the image sensor 103 based on readings from the parasitic heat sensing pixels 105 is for example based on an approximation of the interior surface of the camera housing. For example, the conversion matrices $M^{-1}_{Clum}$ and $M_{Cpix}$ described above are based on a model representing the interior surface of the IR camera housing. Examples of models for approximating the interior surface the housing 404 of FIG. 4 will now be described with reference to FIGS. 8A and 8B.

FIG. 8A is a cross-section view of the housing 404 illustrating an example of a model that is close to the actual form of the housing 404. For example, the model corresponds a surface represented by a dashed line 802 in FIG. 8A, which generally follows the interior surface of the housing 404, but rather than incorporating the lens barrel 404, it has a planar portion 804 at the level of the annular portion 412 of the housing.

FIG. 8B is a cross-section view of the housing 404 illustrating an example of a model represented by a dotted curve 806 that is semi-spherical in shape, in other words in the form of a dome. The radius R of the dome 806 is for example chosen to correspond to the average distance of the interior surface of the housing 404 from image sensor 103. While in the example of FIG. 8B the dome 806 extends from the image plane IP of the image sensor 103, in the case that the field of view of the image sensor 103 is less than 180°, the model could extend from a level of the housing higher that the image plane IP.

According to some embodiments, the model of the interior of the housing is divided into q discrete zones, each zone being considered to have a uniform temperature, as will now be described with reference to FIG. 8C.

FIG. 8C represents a 3D model of the parasitic heat surfaces of the interior of the housing of an IR camera according to an example embodiment in which the model corresponds to the dome 806 of FIG. 8B.

The surface of the model is divided into q discrete zones 808, two of which are shown shaded in the example of FIG. 8C. The discrete zones 808 are for example chosen such that they have substantially the same area as each other. In the example of FIG. 8C, the dome is divided horizontally into slices, and each slice is subdivided into a number of segments of equal width. The height of each slice, and the width of the segments in the slice, for example varies from the bottom to the top of the dome in order to achieve zones of substantially equal area. Of course, FIG. 8C represents only one example of the division of a model into zones, there being many possible ways in which this could be achieved.

The number q of zones is for example equal to at least two, and in some embodiments to at least eight. It will be apparent to those skilled in the art that the greater the number of zones, the better the precision, but the more complex the image processing for correcting the signals of the images based on the luminance vector $\vec{V}_{lum}$.

According to embodiments of the present disclosure, the readings from the parasitic heat sensing pixels are used to estimate an average heat of each zone 808 of the model, as will now be described in more detail with reference to FIGS. 8D, 8E and 8F.

FIGS. 8D and 8E represent angular sensitivity of a parasitic heat sensing pixel in terms of elevation θ and azimuth φ.

As represented by FIG. 8D, each parasitic heat sensing pixel for example has a field of view extending an angle θ in the vertical plane.

FIG. 8E represents an example of a radial absorption function of a parasitic heat sensing pixel. In particular, the centre of vision of the pixel is for example targeted at a certain angle in the horizontal plane, which is 120° in the example of FIG. 8E, and the sensitivity of the pixel decreases for flux received at angles moving away from this point in the horizontal plane. An angle φ representing the angular sensitivity of the pixel can for example be defined as the angle over which the sensitivity is above a certain level. For example, in FIG. 8E the angle φ is defined as the angle over which the sensitivity is at 60% or higher.

There are three possible relations between the observation areas of the parasitic heat sensing pixels and the zones of the model.

According to a first relation, there are as many parasitic heat sensing pixels as zones in the model, and each parasitic heat sensing pixel has an angular sensitivity in θ and φ adapted to a corresponding one of the zones. Thus the reading from each parasitic heat sensing pixel corresponds directly to a reading for a corresponding zone.

According to a second relation, there is a greater number of parasitic heat sensing pixels than zones of the model, and/or the total areas observed by the parasitic heat sensing pixels is greater than the area of the model. For example, the relation is based on following equation:

$$M_{Clum} \cdot \vec{V}_{lum} = \vec{V}_{out}$$

This can be expressed as:

$$\begin{bmatrix} P^1_{w1} & \cdots & P^q_{w1} \\ \vdots & \ddots & \vdots \\ P^1_{Wn} & \cdots & P^q_{wn} \end{bmatrix} \cdot \begin{bmatrix} \phi_1 \\ \vdots \\ \phi_q \end{bmatrix} = \begin{bmatrix} \text{Out1} \\ \vdots \\ \text{Out}n \end{bmatrix}$$

where the model comprises q discrete zones, there are n parasitic heat sensing pixels w1 to wn, the values $\phi_1$ to $\phi_q$ of the vector $\vec{V}_{lum}$, correspond to the parasitic luminance from each zone 1 to q, which is the vector to be found, the values $P_{w1}^1$ to $P_{wn}^1$ of the matrix $M_{Clum}$ represent the contribution of the parasitic heat sensing pixels to each zone 1 to q, and the values Out1 to Outn of the vector $\vec{V}_{out}$ correspond to the readings from the n parasitic heat sensing pixels. In the simplest case (first relation indicated above), each parasitic heat sensing pixel observes only a corresponding zone, and the matrix $M_{Clum}$ is a diagonal matrix. However, in other cases, each zone 1 to q is defined by a set of weighted contributions from one or more of the parasitic heat sensing pixels.

According to a third relation, there are less parasitic heat sensing pixels than discrete zones in the model. In this case, the above matrix $M_{Clum}$ is under-defined, as will now be described with reference to an example of FIG. 8F.

Figure 8F:
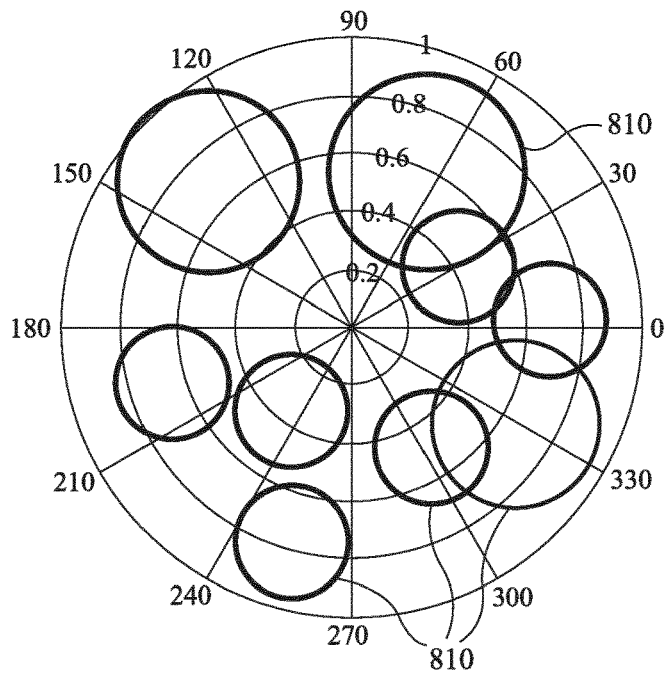
FIG. 8F represents observation areas of parasitic heat sensing pixels according to an example embodiment of the present disclosure.

FIG. 8F is a Lambert azimuthal projection of the observation area 810 of each parasitic heat sensing pixel according to an example embodiment. In particular, the intersection between the dome and a solid angle cone of each pixel creates a measured observation area of each pixel. The luminous flux received from each zone can then be estimated based on local measurements and on a hypothesis relating to the thermal diffusion in each zone. For example, each reading $M_k$ from a parasitic heat sensing pixel k can be evaluated as follows:

$$\sum_{i,j \in \Omega} S_{i,j} \cdot \phi_{i,j} = M_k$$

wherein $\Omega$ is a 2D surface representing the model divided into discrete zones i,j, $S_{i,j}$ is the intersection surface between each zone and the observation area of the pixel k, and $\phi_{i,j}$ is surface luminance flux of zones i,j.

In the case that the entire surface $\Omega$ is not fully observed by the collection of parasitic heat sensing pixels as shown in FIG. 8F, a simple hypothesis can be assumed, which is that the variation of the luminance across the surface of each zone is minimal, which can be expressed as:

$$\Delta \phi_{i,j} = 0$$

where $\Delta$ represents the Laplacian of the luminance. The non-uniformity repartition of the luminance is then for example solved for each zone $\phi_{i,j}$ based on the above hypothesis, and an a priori hypothesis for the thermal diffusion in any white zones, i.e. zones that are not intersected by any observation area 810.

A method of calibrating an IR camera comprising parasitic heat sensing pixels in order to construct the conversion matrices $M^{-1}_{Clum}$ and $M_{Cpix}$ will now be described with reference to FIGS. 9 and 10.

Figure 9:
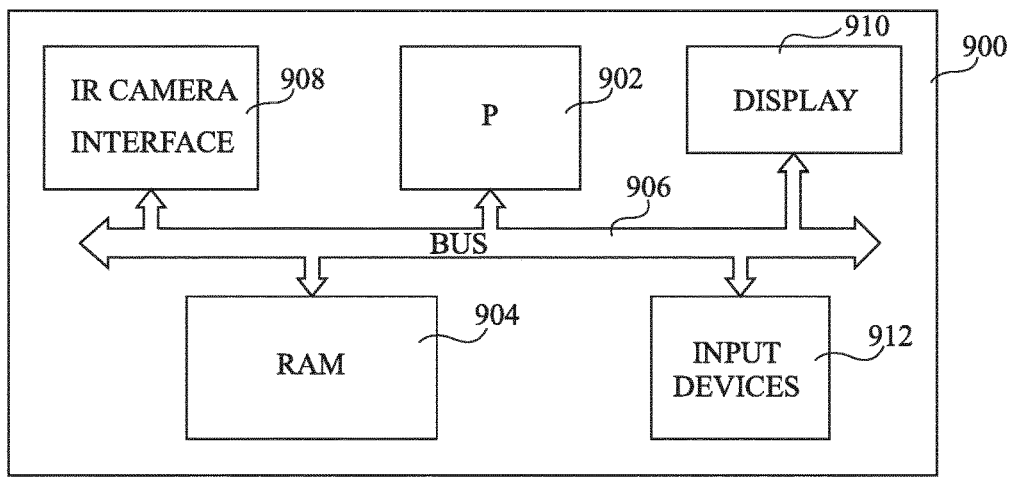
FIG. 9 schematically illustrates a computing device according to an example embodiment of the present disclosure.

FIG. 9 schematically illustrates a computing device 900 configured to perform the calibration of an IR camera according to an example embodiment of the present disclosure. The device 900 for example comprises a processing device (P) 902 comprising one or more processors or CPU cores under control of computing instructions of a computer program stored for example in a memory (RAM) 904 coupled to the processing device 902 by a bus (BUS) 906. The computing device 900 for example further comprises an IR camera interface (IR CAMERA INTERFACE) 908 permitting reception, from the IR camera under calibration, of a captured image from the image sensor and the readings from the parasitic heat sensing pixels. The computing device 900 for example further comprises a display (DISPLAY) 910, and input devices (INPUT DEVICES) 912 such as a keyboard and mouse.

Figure 10:
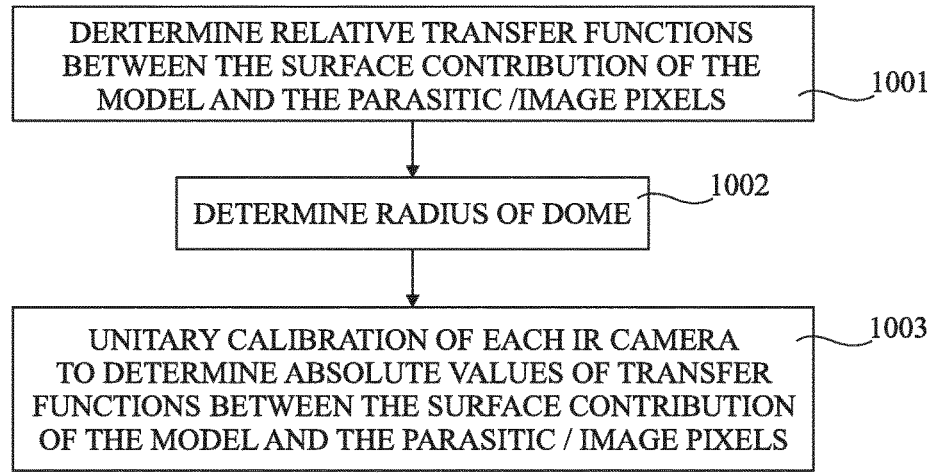
FIG. 10 is a flow diagram representing operations in a method of calibrating an IR camera according to an example embodiment of the present disclosure.

FIG. 10 is a flow diagram representing operations in a method of generating at least one conversion matrix, such as the matrices $M^{-1}_{Clum}$ and $M_{Cpix}$, for converting readings from parasitic heat sensing pixels into signal correction values according to an example embodiment of the present disclosure. This method is for example implemented by the processing device 902 of the computing device 900 of FIG. 9.

The generation of the at least one conversion matrix involves determining the correlation between the outputs of the parasitic heat sensing pixels and the parasitic luminous flux received by each image pixel. In other words, a relative map of the response by each parasitic heat sensing pixel and each image pixel to an exact same luminance variation should be estimated.

This can be represented by the following equation:

$$\Delta \vec{V}_{out(x,y)} = Resp(x, y) * [T_{1(x,y)} \dots T_{q(x,y)}] * \begin{bmatrix} \partial \phi_1 \\ \vdots \\ \partial \phi_q \end{bmatrix}$$

where $\Delta \vec{V}_{out(x,y)}$ is the variation of the output voltage of each pixel at position (x,y), $\partial \phi_i$ is the variation in the luminance $\phi_i$ at each zone i of the model of the interior surface of the housing, $T_{i(x,y)}$ is the etendue of each pixel with respect to each zone i, and Resp(x,y) is the responsivity of each pixel.

When calibrating a standard infrared image pixel array, a gain map is generally used in a process known as a 2-point non-uniformity-correction. In the case of the pixel array of the present disclosure, in practice, exposing the parasitic heat sensing pixels and image pixels to a same luminance variation would be difficult, and the calibration process would be long. Instead, the present inventors propose to perform the calibration using two main operations (1001 and 1003), as will now be described in more detail.

In an operation 1001, relative transfer functions are determined between the surface contribution of the interior surface of the camera housing and the luminous flux received by the parasitic heat sensing pixels and by the image pixels. This corresponds to the etendue between each pixel and the various zones i of the model. In this operation, it is assumed that all of the pixels have the same response in terms of their voltage generated for a given received luminous flux of a given power (watts, W) and for a given solid angle (steradian, sr). Based on the geometry of the camera housing and of the pixels of the pixel array, the etendue $T_{i(x,y)}$ of each parasitic heat sensing pixel and of each image pixel at position (x,y) with respect to each zone i can for example be estimated, as will now be described.

As known by those skilled in the art, in the field of optics, the etendue defines the extent to which light is spread out in area and angle.

The etendue $T_{i(x,y)}$ for each pixel of the pixel array with respect to a zone i of the interior surface of the camera housing, assuming that this surface is in the form of a dome of radius R, can be defined as follows:

$$T_{i(x,y)} = S_{pixel} \cdot \int\int_{\theta, \varphi}^{\pi, 2\pi} \frac{R^2 \cdot \sin(\theta) \cdot \cos(\theta) \cdot (R^2 - R \cdot d \cdot \sin(\theta) \cdot \cos(\varphi))}{\left(R^2 + d^2 - 2 \cdot R \cdot d \cdot \sin(\theta) \cdot \cos(\varphi)\right)^2} \cdot d\varphi \cdot d\theta$$

where $S_{pixel}$ is the surface area of the pixel, $\theta$ is the elevation angle, $\varphi$ is the azimuth angle, and d is the distance between the pixel and the centre of the dome. Thus, based on the geometry of the pixel array and of the interior of the camera, it is possible to estimate etendue $T_{i(x,y)}$ of each image pixel and parasitic heat sensing pixel based on the above equation.

The operation 1001 is for example performed once for a given type of IR camera having a given housing and pixel array, the generated etendues being relevant to any IR camera having the given geometry of the camera housing and of the pixel array.

Optionally, in an operation 1002, one or more parameters of the model of the interior of the housing of the IR camera may be determined. For example, in the case that the model is a dome, the radius R of the model of the dome is for example defined based on an estimate of the average level of luminous flux received from the interior of the housing.

In an operation 1003, a unitary calibration is for example performed for each IR camera unit in a family of products in order to determine absolute values of the transfer functions between the surface contribution of the model of the interior surface of the camera housing and the pixel readings from the image sensor and from the parasitic heat sensing pixels. In particular, this for example involves determining the relative responsivity Resp(x,y) of each pixel for a same solid angle. For the image pixels of the image sensor, the responsivity Resp(x,y) can for example be determined using known calibration techniques, such as based on 2-point non-uniformity-correction. As regards the characterisation of the parasitic heat sensing pixels, this is for example performed by placing a dome-shaped black-body over the pixel array and obtaining readings from each of the parasitic heat sensing pixels for two different temperatures of the black body.

Once this relative responsivity has been determined for each pixel, the matrices $M^{-1}_{Clum}$ and $M_{Cpix}$ can for example be determined based on the responsivity Resp(x,y) and etendue $T_{i(x,y)}$ of each pixel.

An advantage of the embodiments described herein is that a parasitic heat component in an image captured by an IR camera can be estimated relatively precisely without the use of a temperature probe. For example, the present inventors have found that a precision as low as +/−1° C. can be achieved.

Having thus described at least one illustrative embodiment, various alterations, modifications and improvements will readily occur to those skilled in the art. For example, it will be apparent to those skilled in the art that the embodiments of the parasitic heat sensing pixels merely provide one example, and that other pixel structures for limiting the field of view of the pixels would be possible.

Furthermore, while example embodiments have been described in relation with a dome-shaped model, it will be apparent to those skilled in the art how the calculations could be adapted to other forms of models.

Furthermore, it will be apparent to those skilled in the art that, while embodiments have been described involving the use of two conversion matrices $M^{-1}_{Clum}$ and $M_{Cpix}$, in alternative embodiments a single conversion matrix, or more than two conversion matrices, could be employed.

Furthermore, it will be apparent to those skilled in the art that the various features described in relation with the various embodiments could be combined, in alternative embodiments, in any combination.

The invention claimed is:

1. An infrared camera comprising a housing containing a pixel array, wherein the pixel array comprises:
   image pixels forming an image sensor arranged to receive infrared light from an image scene;
   a plurality of parasitic heat sensing pixels, a first of said parasitic heat sensing pixels being orientated in a different manner from a second of said parasitic heat sensing pixels such that the first and second parasitic heat sensing pixels receive infrared light from different portions of an interior surface of said housing;
   a signal correction circuit configured to receive readings from the plurality of parasitic heat sensing pixels, to convert said readings into correction values using a conversion matrix, and to perform 2D signal correction on an image captured by said image sensor based on said correction values, wherein said correction values comprise a correction value for each pixel of said image; and
   a non-volatile memory storing said conversion matrix for converting said readings into said correction values for performing said 2D signal correction;
   wherein:
   the first parasitic heat sensing pixel is configured to directly receive infrared light only from a first area of the interior surface of said housing;
   the second parasitic heat sensing pixel is configured to directly receive infrared light only from a second area of the interior surface of said housing; and
   the first and second areas are non-overlapping.

2. The infrared camera of claim 1, further comprising at least one partial light shield positioned over the parasitic heat sensing pixels, the at least one partial light shield partially restricting the field of view of each parasitic heat sensing pixel.

3. The infrared camera of claim 2, wherein the at least one partial light shield comprises at least one opening associated with each parasitic heat sensing pixel, the positions of the openings being misaligned with a heat sensitive layer of each pixel.

4. The infrared camera of claim 2, wherein the at least one partial light shield is arranged such that one or more of the parasitic heat sensing pixels receives only reflected infrared light.

5. The infrared camera of claim 1, wherein:
   each of the pixels of the pixel array is a microbolometer comprising a heat sensitive membrane suspended over a reflective surface; and
   a distance separating the heat sensitive membrane from the reflective surface in said parasitic heat sensing pixels is different from the distance separating the heat sensitive membrane from the reflective surface in said image pixels.

6. The infrared camera of claim 1, further comprising at least one wall formed adjacent to one or more of said parasitic heat sensing pixels and blocking infrared light at certain angles from falling on said one or more parasitic heat sensing pixels.

7. A method of correcting, by a processing device, an image captured by an image sensor of a pixel array of an infrared camera, the method comprising:
   receiving readings from a plurality of parasitic heat sensing pixels of said pixel array, a first of said parasitic heat sensing pixels being orientated in a different manner from a second of said parasitic heat sensing pixels such that the first and second parasitic heat sensing pixels receive infrared light from different portions of an interior surface of a housing of the IR camera; and
   correcting an image captured by said image sensor by converting said readings into correction values for performing 2D signal correction of said image, said conversion being based on one or more conversion matrices, said corrections values comprising a correction value for each pixel of said image;
   wherein:
   the first parasitic heat sensing pixel is configured to directly receive infrared light only from a first area of the interior surface of said housing;
   the second parasitic heat sensing pixel is configured to directly receive infrared light only from a second area of the interior surface of said housing; and
   the first and second areas are non-overlapping.

8. The method of claim 7, wherein converting said readings into correction values comprises:
- converting, using a first conversion matrix of the one or more conversion matrices, said readings into estimates of the luminous flux received from each of a plurality of zones of a model of the interior surface of said housing, each zone being considered to have a uniform temperature; and
- converting, using a second conversion matrix of the one or more conversion matrices, said estimates of the luminous flux received from each of said plurality of zones into the pixel correction values.

9. The method of claim 8, wherein said model of the interior surface of said housing is a dome.

10. A non-transitory storage medium storing computing instructions for implementing the method of claim 7 when executed by a processing device.

* * * * *